United States Patent
Sayyed et al.

(10) Patent No.: US 12,204,887 B2
(45) Date of Patent: Jan. 21, 2025

(54) SEAMLESS AND SECURE MOTHERBOARD REPLACEMENT SYSTEM AND METHOD

(71) Applicant: Dell Products, L.P., Round Rock, TX (US)

(72) Inventors: Ibrahim Sayyed, Georgetown, TX (US); Shekar Babu Suryanarayana, Bangalore (IN); Elmira M. Bonab, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 192 days.

(21) Appl. No.: 17/935,656

(22) Filed: Sep. 27, 2022

(65) Prior Publication Data

US 2024/0103837 A1 Mar. 28, 2024

(51) Int. Cl.
| | | |
|---|---|---|
| G06F 9/445 | (2018.01) | |
| G06F 8/65 | (2018.01) | |
| G06F 9/455 | (2018.01) | |
| G06F 21/00 | (2013.01) | |
| G06F 21/60 | (2013.01) | |
| G06F 21/64 | (2013.01) | |
| G06F 21/82 | (2013.01) | |

(52) U.S. Cl.
CPC .............. G06F 8/65 (2013.01); G06F 21/602 (2013.01); G06F 21/64 (2013.01)

(58) Field of Classification Search
CPC .......... G06F 8/65; G06F 21/602; G06F 21/64; G06F 9/4406; G06F 9/4401; G06F 9/45533; G06F 12/16; G06F 1/30; G06F 11/1441; G06F 11/07; G06F 9/5016; G06F 21/82; G06F 21/71; G06F 21/575; G06F 21/34; G06F 21/33; G06F 21/73; G06F 11/20; G06F 21/10; G06F 11/006
See application file for complete search history.

(56) References Cited

U.S. PATENT DOCUMENTS

| | | | | |
|---|---|---|---|---|
| 6,463,537 | B1 * | 10/2002 | Tello | G06F 21/82 |
| | | | | 713/185 |
| 8,640,118 | B2 * | 1/2014 | Grice | G06F 8/654 |
| | | | | 717/170 |
| 2002/0060703 | A1 * | 5/2002 | Tsukada | G06K 15/1803 |
| | | | | 347/19 |
| 2012/0195548 | A1 * | 8/2012 | Brunner | H05K 1/14 |
| | | | | 385/16 |
| 2020/0218527 | A1 * | 7/2020 | Ganesan | G06F 8/65 |
| 2022/0092188 | A1 * | 3/2022 | Khatri | H04L 9/3263 |

* cited by examiner

Primary Examiner — Thuy Dao
(74) Attorney, Agent, or Firm — Fogarty LLP

(57) ABSTRACT

Systems and methods for providing a seamless and secure motherboard replacement system and method are described. In some embodiments, an Information Handling System (IHS) may include a processor and a memory coupled to the processor, the memory having program instructions that, upon execution, cause the IHS to when a previous motherboard is replaced with a replacement motherboard; detect that the previous motherboard has been replaced with the replacement motherboard, access context data associated with the previous motherboard from a storage unit configured in the IHS, the context data comprising configuration settings of the previous motherboard, and update the replacement motherboard according to the stored context information.

16 Claims, 5 Drawing Sheets

SEAMLESS AND SECURE MOTHERBOARD REPLACEMENT SYSTEM AND METHOD

BACKGROUND

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

In most IHSs, low-level code is used as an intermediary between hardware components and the Operating System (OS), as well as other high-level software. In some IHSs, this low-level code is known as the Basic Input/Output System (BIOS). The BIOS provides a set of software routines that allow high-level software to interact with hardware components using standard calls. Because of certain limitations of the original BIOS, a new specification for creating code that is responsible for booting the IHS has been developed that is called the Extensible Firmware Interface (EFI) Specification, and which has been extended by the Unified Extensible Firmware Interface Forum (UEFI).

The EFI Specification describes an interface between the OS and the system firmware. In particular, the EFI Specification defines the interface that platform firmware must implement and the interface that the OS may use in booting. The EFI Specification also specifies that protocols should be provided for EFI drivers to communicate with each other. An EFI protocol is an interface definition provided by an EFI driver. The EFI core provides protocols for allocation of memory, creating events, setting the clock, and the like.

Computer motherboards typically include firmware and an associated firmware interface, such as a basic input/output system (BIOS) or unified extensible firmware interface (UEFI). Users can configure the firmware after purchase beyond the motherboard's default settings. Firmware can also be customized for various configurations or purposes. For example, a rack server may be sold to different customers in which each customer has unique configuration settings. Additionally, a vendor can preload different configurations stored in firmware in advance for different customers.

SUMMARY

Systems and methods for providing a seamless and secure motherboard replacement system and method are described. In some embodiments, an Information Handling System (IHS) may include a processor and a memory coupled to the processor, the memory having program instructions that, upon execution, cause the IHS to when a previous motherboard is replaced with a replacement motherboard; detect that the previous motherboard has been replaced with the replacement motherboard, access context data associated with the previous motherboard from a storage unit configured in the IHS, the context data comprising configuration settings of the previous motherboard, and update the replacement motherboard according to the stored context information.

According to another embodiment, a method includes the steps of detecting that a previous motherboard has been replaced with a replacement motherboard, accessing context data associated with the previous motherboard from a storage unit configured in an IHS, and updating the replacement motherboard according to the stored context information. The context data includes configuration settings of the previous motherboard.

According to yet another embodiment, a Basic I/O System (BIOS) has program instructions stored thereon that, upon execution by an Information Handling System (IHS), cause an IHS to, when a previous motherboard is replaced with a replacement motherboard, detect that the previous motherboard has been replaced with the replacement motherboard, access context data associated with the previous motherboard from a storage unit configured in the IHS, and update the replacement motherboard according to the stored context information.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Figure 1:
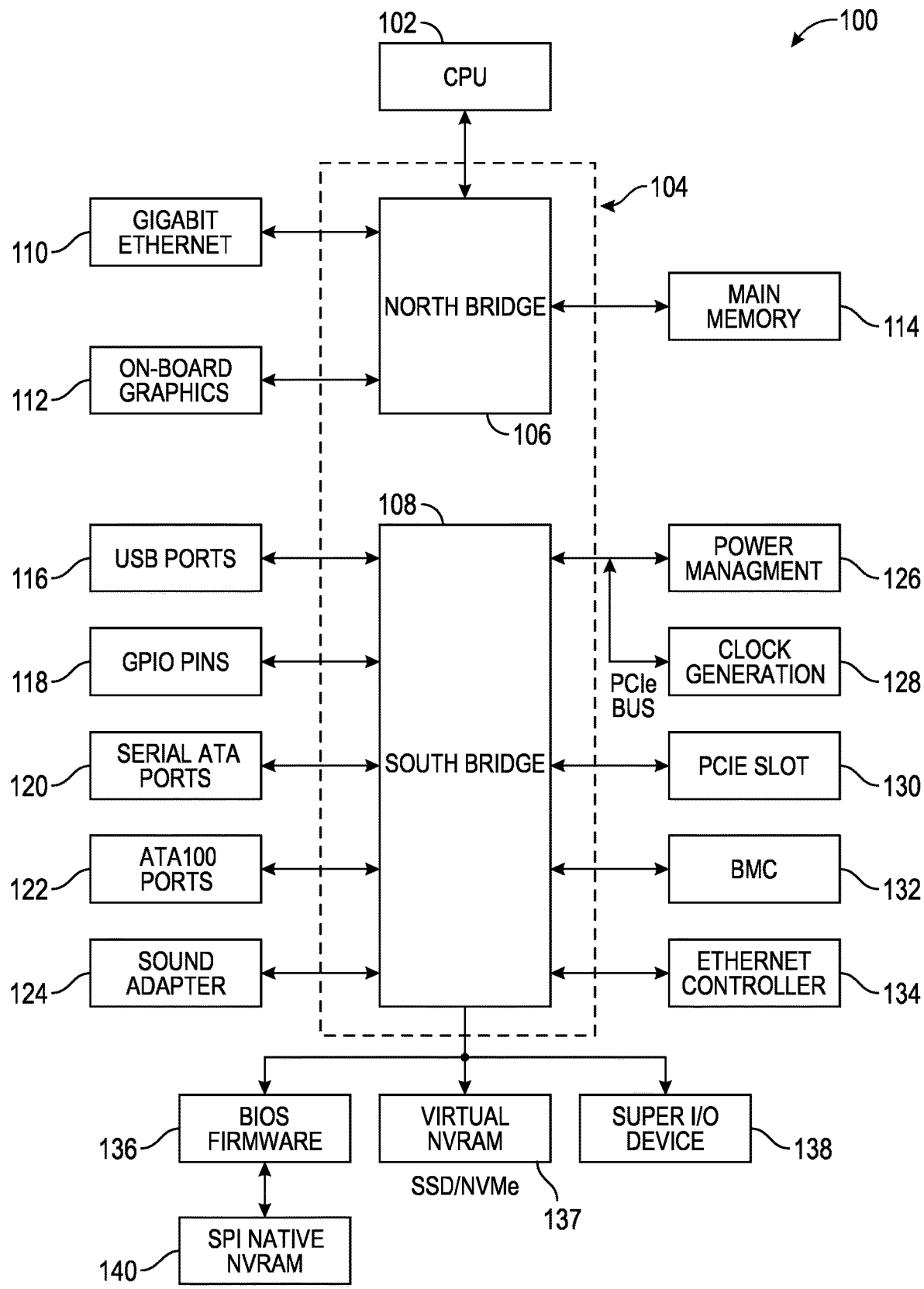
FIG. 1 shows an example of an IHS that may be configured to implement the motherboard replacement system and method described herein.

The present disclosure is described with reference to the attached figures. The figures are not drawn to scale, and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

System hardware components of an IHS, such as CPUs, DIMMs, PICe Cards (e.g., Graphics, Network, WiFi, etc.), SSD/HDD devices and the like may need replacement and/or updating for assorted reasons, such as to enable an upgrade to a faster processor, faster memory, and/or faster graphics. Other reasons for replacing components may be to support the latest internal bus technologies, such as ATA/133 or Serial ATA, to enable to use external peripherals using USB or FireWire technology, to increase expansion slot potential, and the like. Additionally, a motherboard upgrade may also be performed for distinct reasons, including to meet latest technology requirements.

A motherboard is the backbone of an IHS; that is, one that provides a platform for connecting many components (e.g., CPU, GPU, memory, etc.) and peripheral devices (e.g., NIC cards) used by the IHS. It is of critical importance both in terms of system performance and connectivity. Nevertheless, motherboard replacement can be a burdensome affair, particularly due to custom settings that need to be transferred from the previous motherboard to the replacement motherboard. For example, firmware (e.g., BIOS, UEFI, etc.) on an Information Handling System (IHS) can be customized from its default settings. If a particular default setting is not what a user desires, the user may be required to perform multiple steps on multiple machines to reconfigure the firmware. For example, the customer may be required to search for or create a configuration update file for use with the firmware manipulation or flashing utility. Then the specific procedures for that motherboard and/or firmware should be followed to install the configuration update file, such as a firmware update to flash the BIOS. This process, however, can present difficulties in cost and time to deploy, as well as pose a risk that the process does not complete properly and renders the firmware unusable. These risks may be compounded when a customer desires to update or configure new default firmware settings on multiple devices.

For IHS vendors, Reliable, Accessible and Serviceable (RAS) is a key pillar of product quality and providing seamless, secure, and reduced downtime possesses significant value to IHS customers and addresses their current pain points reported for part replacement scenarios. For example, DELL TECHNOLOGIES, which is a vendor of high quality IHSs that span across a broad range of product offerings, has reported approximately 3.2 million motherboard replacements in the field during fiscal year 2022, and each motherboard replacement has yielded a pain point due to the necessity of manually migrating the custom BIOS and/or UEFI settings from the previous motherboard to the replacement motherboard.

The motherboard may fail for several reasons, thus needing replacement. For example, electrical spikes and surges caused by problems with electrical wiring, problems with the power service outside the house, or the result of a lightning strike may damage the motherboard to the point that it needs replacement. Additionally, dust, pet hair and debris may block air circulation that keeps the machine cool, thus causing the motherboard to overheat. Overheating of the motherboard can also occur due to gaming, rendering video, watching videos, fluctuations in power supply, laptop heatsink blocked with dust, and the like. The motherboard may also incur manufacturer design defects. Motherboards are mass produced and there are chances that manufacturing defects may occur. Another motherboard failure may include a Power On Self Test (POST) failure in which the IHS does not boot to DXE phase due to SPI flash corruption, a condition whose only option may be to dispatch a new motherboard for replacement.

After the motherboard is dispatched using conventional techniques, there exists no intelligence available to retrain the EC/BIOS firmware on the replacement motherboard to the context of the previous motherboard. Example settings that may affect the context of the motherboard may include any flash update revision checks, BKC attributes, OS/VM context configurations, and the like. If the mother board replacement is not handled properly, the certificates/keys inside the UEFI secure boot database may be lost such that the security context cannot be restored back to the same level as on with faulty mother board. Additionally, if BIOS Security configurations (e.g., Secure Boot/TPM On/Thunderbolt Security, Custom Boot Order variables, etc.) are not restored, then platform custom security settings may be restored to factory defaults such that the user sees a change in security behavior. Firmware actions to previously reported telemetry events, such as firmware tampering, Root of Trust (ROT), and the like may be lost, and thus firmware remediation actions will become difficult while unexpected behavior may be observed on the IHS. Upon loosing vendor support (e.g., SupportAssist or Excalibur profiles), BIOSConnect URLs, HTTPs TLS certificates, the platform may lose the capability of recovery remediation functionality, thus needing to be reconfigured again. Considering a virtual environment, the host Operating System (OS) and Virtual Machine (VM) settings saved into UEFI NVRAM would be set to factory default, which forces the user to reconfigure the settings.

As will be described in detail herein below, embodiments of the present disclosure provide a solution to the aforementioned problems, among others, using a seamless and secure motherboard replacement system and method that transfers context information associated with a motherboard that is being replaced to a replacement motherboard in a secure manner. The seamless and secure motherboard replacement system and method creates a context-based binary object (blob) in an NVMe storage space, which is stored with various platform security attributes, boot path configuration, networking profiles, and the like in an incremental fashion based on update versioning. The system and method also provide a first power on authentication protocol to securely identify the binary object by dynamically determining the previous part versus current replaced part security context and enable the first boot. The system and method also provide a Functional Context Restore(FCR) with BIOS/EC meta-data path to dynamically train the platform boot path with a previous/last successful boot path context.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below.

FIG. 1 shows an example of an IHS configured to implement the motherboard replacement system and method described herein. It should be appreciated that although certain embodiments described herein may be discussed in the context of a desktop or server computer, other embodiments may be utilized with virtually any type of IHS. Particularly, the IHS includes a baseboard or motherboard 100, which is a printed circuit board (PCB) to which components or devices are mounted to by way of a bus or other electrical communication path. For example, Central Processing Unit (CPU) 102 operates in conjunction with a chipset 104. CPU 102 is a processor that performs arithmetic and logic necessary for the operation of the IHS.

Chipset 104 includes northbridge 106 and southbridge 108. Northbridge 106 provides an interface between CPU 102 and the remainder of the IHS. Northbridge 106 also provides an interface to a random access memory (RAM) used as main memory 114 in the IHS and, possibly, to on-board graphics adapter 112. Northbridge 106 may also be configured to provide networking operations through Ethernet adapter 110. Ethernet adapter 110 is capable of connecting the IHS to another IHS (e.g., a remotely located IHS) via a network. Connections which may be made by Ethernet adapter 110 may include local area network (LAN) or wide area network (WAN) connections. Northbridge 106 is also coupled to southbridge 108.

Southbridge 108 is responsible for controlling many of the input/output (I/O) operations of the IHS. In particular, southbridge 108 may provide one or more universal serial bus (USB) ports 116, sound adapter 124, Ethernet controller 134, and one or more general purpose input/output (GPIO) pins 118. Southbridge 108 may also provide a bus for interfacing peripheral card devices such as PCIe slot 130. In some embodiments, the bus may include a peripheral component interconnect (PCI) bus. Southbridge 108 may also provide baseboard management controller (BMC) 132 for use in managing the various components of the IHS. Power management circuitry 126 and clock generation circuitry 128 may also be utilized during operation of southbridge 108.

Additionally, southbridge 108 is configured to provide one or more interfaces for connecting mass storage devices to the IHS. For instance, in an embodiment, southbridge 108 may include a serial advanced technology attachment (SATA) adapter for providing one or more serial ATA ports 120 and/or an ATA100 adapter for providing one or more ATA100 ports 122. Serial ATA ports 120 and ATA100 ports 122 may be, in turn, connected to one or more mass storage devices storing an operating system (OS) and application programs.

An OS may comprise a set of programs that controls operations of the IHS and allocation of resources. An application program is software that runs on top of the OS and uses computer resources made available through the OS to perform application-specific tasks desired by the user.

Mass storage devices connected to southbridge 108 and PCIe slot 130, and their associated computer-readable media provide non-volatile storage for the IHS. Although the description of computer-readable media contained herein refers to a mass storage device, such as a hard disk or CD-ROM drive, it should be appreciated by a person of ordinary skill in the art that computer-readable media can be any available media on any memory storage device that can be accessed by the IHS. Examples of memory storage devices include, but are not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices.

A low pin count (LPC) interface may also be provided by southbridge 108 for connecting Super I/O device 138. Super I/O device 138 is responsible for providing a number of I/O ports, including a keyboard port, a mouse port, a serial interface, a parallel port, and other types of input/output ports.

The LPC interface may connect a computer storage media such as a ROM or a flash memory such as a non-volatile random access memory (NVRAM) for storing BIOS/firmware 136 that includes BIOS program code containing the basic routines that help to start up the IHS and to transfer information between elements within the IHS. BIOS/firmware 136 comprises firmware compatible with the Extensible Firmware Interface (EFI) Specification and Framework.

The LPC interface may also be utilized to connect virtual NVRAM 137 (e.g., SSD/NVMe) to the IHS. The virtual NVRAM 137 may be utilized by BIOS/firmware 136 to store configuration data for the IHS. In other embodiments, configuration data for the IHS may be stored on the same virtual NVRAM 137 as BIOS/firmware 136. The HIS 100 may also include a SPI native NVRAM 140 coupled to the BIOS 136.

BMC 132 may include non-volatile memory having program instructions stored thereon that enable remote management of the IHS. For example, BMC 132 may enable a user to discover, configure, and manage the IHS, setup configuration options, resolve and administer hardware or software problems, etc. Additionally or alternatively, BMC 132 may include one or more firmware volumes, each volume having one or more firmware files used by the BIOS' firmware interface to initialize and test components of the IHS.

As a non-limiting example of BMC 132, the integrated DELL Remote Access Controller (iDRAC) from DELL, INC. is embedded within DELL POWEREDGE servers and provides functionality that helps information technology (IT) administrators deploy, update, monitor, and maintain servers with no need for any additional software to be installed. The iDRAC works regardless of OS or hypervisor presence from a pre-OS or bare-metal state because iDRAC is embedded within the IHS from the factory.

It should be appreciated that, in other embodiments, the IHS may comprise other types of computing devices, including hand-held computers, embedded computer systems, personal digital assistants, and other types of computing devices. It is also contemplated that the IHS may not include all of the components shown in FIG. 1, may include other components that are not explicitly shown in FIG. 1, or may utilize a different architecture.

Figure 2:
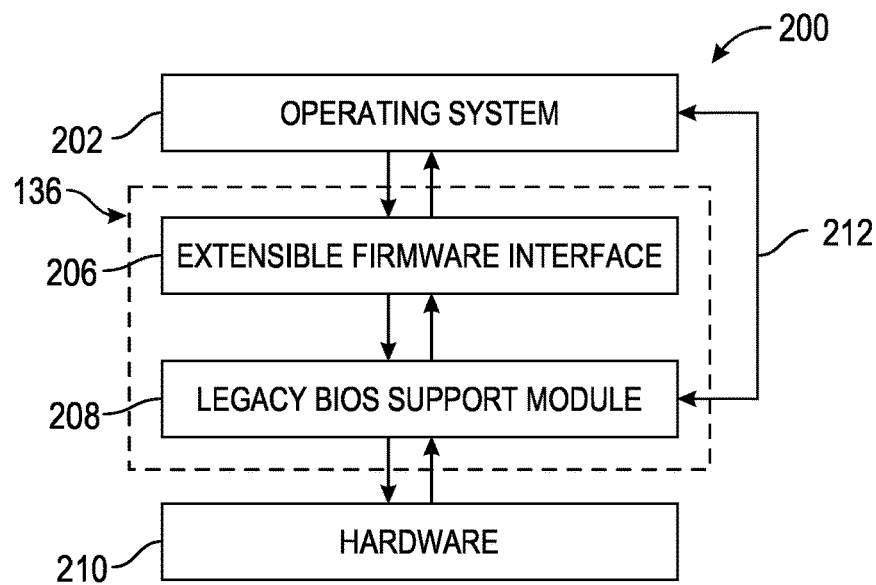
FIGS. 2 and 3 are block diagrams of examples of aspects of Basic Input/Output (BIOS) or Extensible Firmware Interface (EFI) firmware configured to implement systems and methods, according to one embodiment of the present disclosure.

Referring now to FIG. 2, examples of aspects of an EFI environment 200 created by BIOS/firmware 136 of the IHS are described. As shown, BIOS/firmware 136 comprises firmware compatible with the EFI Specification from INTEL CORPORATION or from the UEFI FORUM. The EFI Specification describes an interface between OS 202 and BIOS/firmware 136. Particularly, the EFI Specification defines the interface that BIOS/firmware 136 implements and the interface that OS 202 may use in booting to use hardware 210.

According to an implementation of EFI, both EFI 206 and legacy BIOS support module 208 may be present in BIOS/firmware 136. This allows the IHS to support both firmware interfaces. In order to provide this, interface 212 may be used by legacy OSs and applications. Additional details regarding the architecture and operation of the EFI 206 are provided below with respect to FIG. 3.

Figure 3:
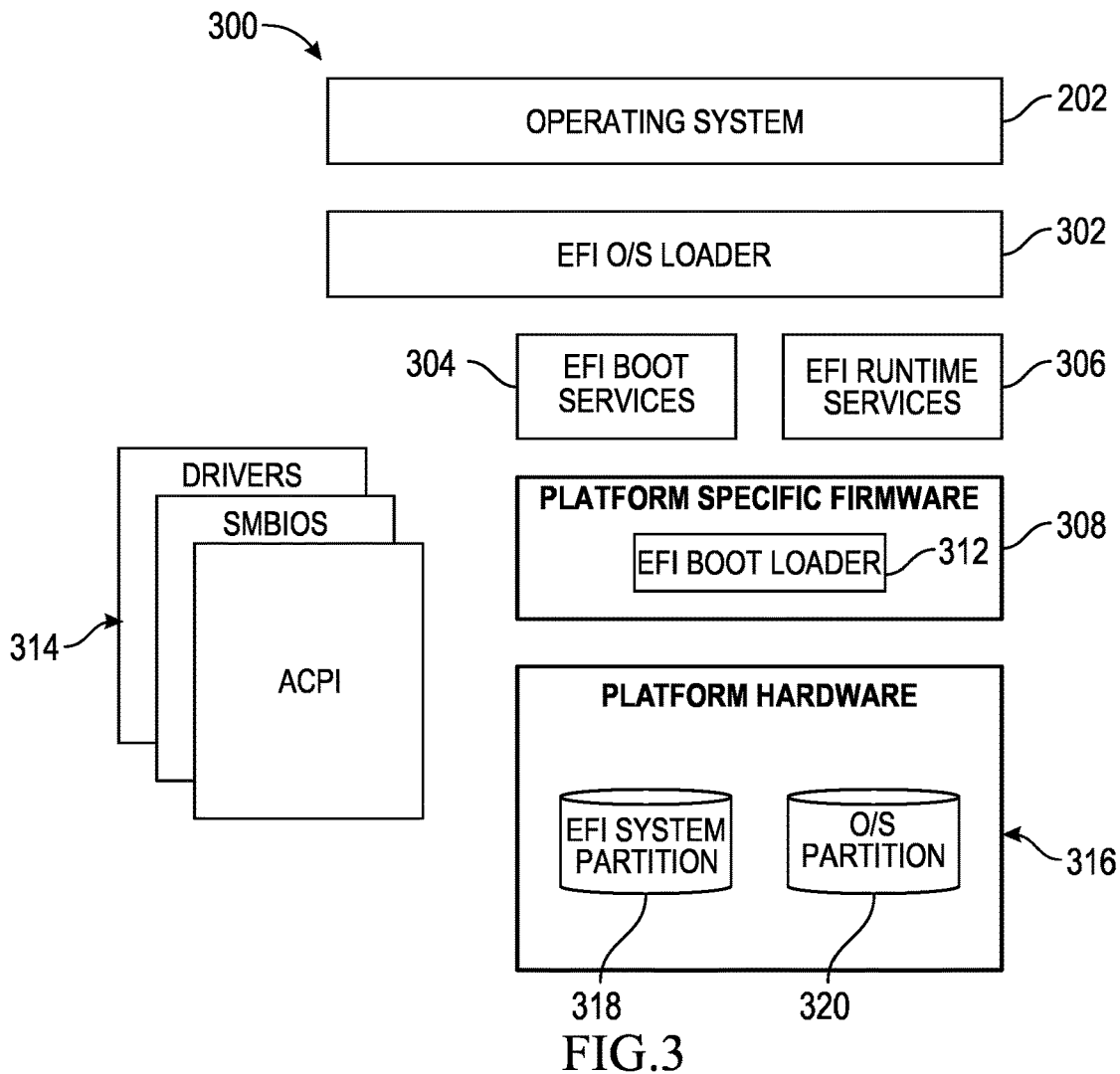

FIG. 3 provides additional details regarding an EFI Specification-compliant system 300 utilized to provide an operating environment to facilitate initialization and reconfiguration of replacement motherboards. As shown, system 300 includes platform hardware 316 and OS 202. Platform specific firmware 308 may retrieve an OS image from EFI system partition 318 using an EFI O/S loader 302. EFI system partition 318 may be an architecturally shareable system partition. As such, EFI system partition 318 defines a partition and file system that are designed to allow safe sharing of mass storage between multiple vendors. O/S partition 320 may also be utilized.

Once started, EFI O/S loader 302 continues to boot the complete OS 202. In doing so, EFI O/S loader 302 may use EFI boot services 304 and interface to other supported specifications to survey, comprehend, and initialize the various platform components and the operating system software that manages them. Thus, drivers 314 from other specifications may also be present on system 300. For example, the Advanced Configuration and Power Management Interface (ACPI) and the System Management BIOS (SMBIOS) specifications may be supported.

EFI boot services 304 provide interfaces for devices and system functionality that can be used during boot time. EFI runtime services 306 may also be available to the EFI O/S loader 302 during the boot phase. For example, a minimal set of runtime services may be presented to ensure appropriate abstraction of base platform hardware resources that may be needed by the operating system 202 during its normal operation. EFI allows extension of platform firmware by loading EFI driver and EFI application images which, when loaded, have access to EFI-defined runtime and boot services.

Various program modules provide the boot and runtime services. These program modules may be loaded by the EFI boot loader 312 at system boot time. EFI boot loader 312 is a component in the platform specific firmware 308 that determines which program modules should be explicitly loaded and when. Once the platform specific firmware 308 is initialized, it passes control to EFI boot loader 312. EFI boot loader 312 is then responsible for determining which of the program modules to load and in what order.

In that context, UEFI Secure Boot is an industry-standard mechanism in the system BIOS for authenticating pre-boot code modules (e.g., device drivers or other software or firmware code). The UEFI specification defines data structures and logic for the authentication process. The BIOS maintains a Secure Boot policy having X.509 certificates, public keys, and image digests. The BIOS enforces the Secure Boot policy for each pre-boot code module that loads during the boot process. If a pre-boot code module cannot be authenticated or does not otherwise satisfy the Secure Boot policy, the BIOS does not load that module.

Figure 4:
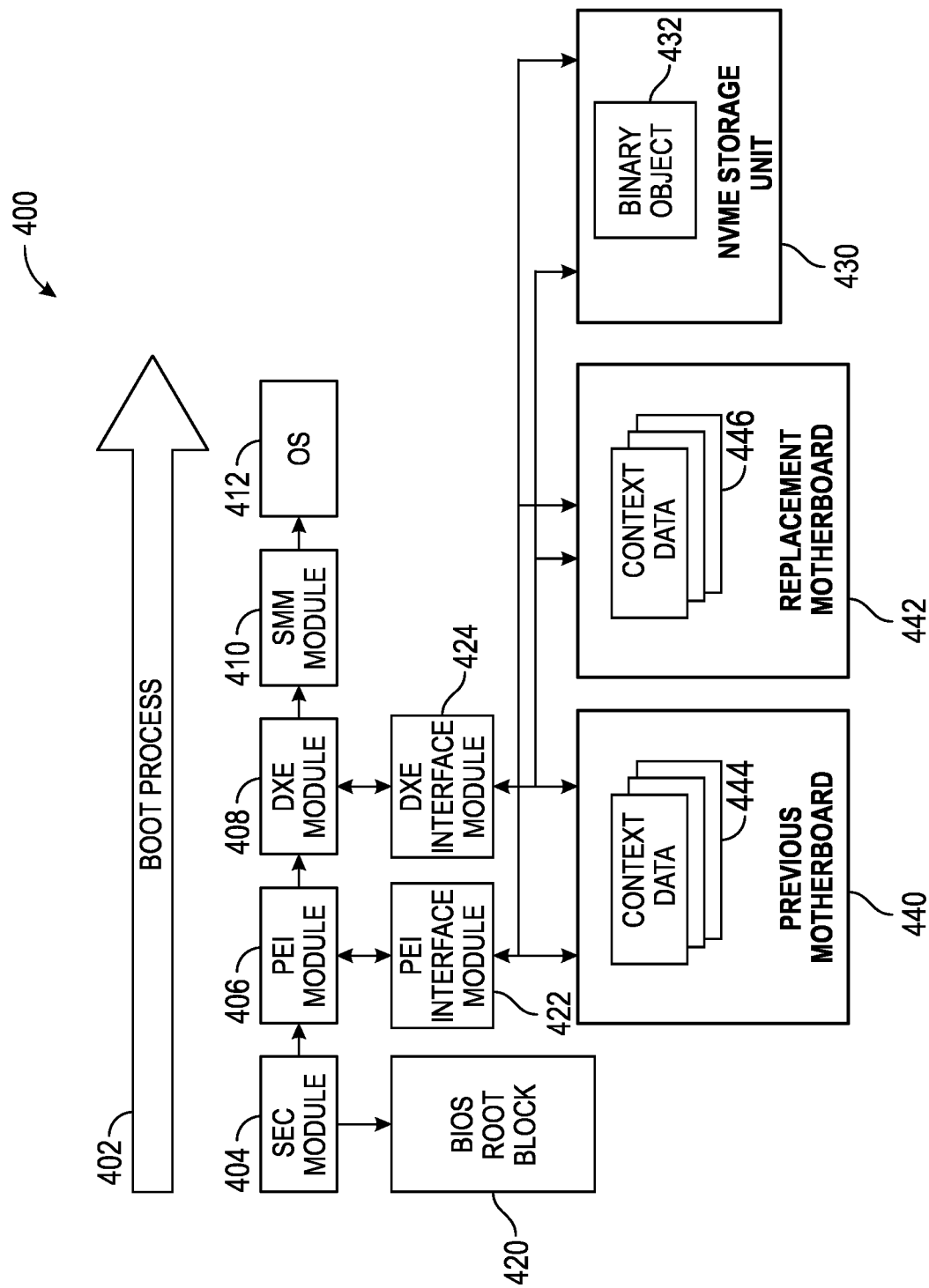
FIG. 4 illustrates an example motherboard replacement system that may be used for secure and seamless access by various boot architectures according to one embodiment of the present disclosure.

FIG. 4 illustrates an example motherboard replacement system 400 that may be used for secure and seamless access by various boot architectures according to one embodiment of the present disclosure. The system 400 executes a boot process 402, such as an UEFI boot process, that takes place in multiple phases, such as a Security (SEC) phase performed by a SEC module 404, a Pre-EFI Initialization (PEI) phase performed by a PEI module 406, a driver execution environment (DXE) phase performed by a DXE module 408, and a Systems Management Mode (SMM) phase performed by a SMM module 410 on an IHS, such as IHS 100 of FIG. 1. The boot process 402 may also execute an Operating System (OS) phase executed by an OS 412, which is loaded and started on the IHS 100. The SEC module 404, PEI module 406, DXE module 408, and SMM module 410 may collectively form a BIOS/Firmware 136 as shown in FIG. 1. In this context, the BIOS/Firmware 136 should be construed as encompassing at least the boot block as that term is defined above. In some embodiments, the BIOS/Firmware 136 may also include other components of the BIOS and even all of the BIOS. However, in some implementations, some components that may be considered as being part of the BIOS may be stored in other locations.

The system 400 also includes a bios root block 420, a PEI interface module 422, a DXE interface module 424, and a NVMe storage unit 430. While the PEI interface module 422 and DXE interface module 424 are shown independently of the PEI module 406 and DXE module 408, respectively, it should be appreciated that the PEI interface module 422 and DXE interface module 424 may be integrated within the PEI module 406 and DXE module 408 without departing from the spirit and scope of the present disclosure. The PEI interface module 422 and DXE interface module 424 communicate with the NVMe storage unit 430 to perform the various features described herein.

In general, the NVMe storage unit 430 is not typically replaced when a previous motherboard 440 is replaced with a replacement motherboard 442. As such, the system 400 acquires context data 444 from the previous motherboard 440 while it is still configured in the IHS, and stores the context data 444 as a binary object 432 (blob) in the NVMe storage unit 430. When the replacement motherboard 442 is deployed in the IHS, the system 400 configures the replacement motherboard 442 with the context data 446 from the binary object 432, when possible, so that the replacement motherboard 442 has the same or close to the same context as the previous motherboard 440.

In one embodiment, the system 400 creates binary object 432 in the NVMe storage unit 430 with various platform security attributes, boot path configuration, networking profiles, and the like, in an incremental fashion based on update versioning. Restoring the context data to the replacement motherboard 442 is shared between the PEI and DXE phase of the boot process following motherboard replacement. The PEI interface module 422 initializes the factory programmed defaults based on new hardware detection and allocates the memory to store the context data 446 by creating a hand-off block handler.

Examples of context data that may be stored in the binary object 432 may include certificates and/or keys, BIOS Security configuration (e.g., SB/TPM ON/Thunderbolt security, custom boot order variables, etc.), BIOS FW revisions, a telemetry event created and notified to OS on a change, SA/Excalibur profiling BIOSConnect URLs HTTPs TLS certificates, update eDiags/Telemetry/Excalibur, EC managed NVRAM storage, certain recorded security incidents like firmware tampering, Root of Trust (ROT), host OS VM settings, and the like.

The context data restore process loads in early DXE phase and locates the NVMe namespace, based on secure authorization. Thereafter, the Context Specific Payload (CSP) is loaded and the tuning process begins with the factory programmed default versus the previous context to upgrade to the new hardware context. The restore map is published into Hand-off offset and rebooted to perform a Context Specific Payload restore based boot, which loads the OS seamlessly to the user.

The system 400 provides a Functional Context Restore (FCR) using a BIOS/EC meta-data path to dynamically train the platform boot path with a previous/last successful boot path context. This may be accomplished using a First Power ON authentication process (e.g., application) inside BIOS (PBA) that scans the SSD device partition to identify whether the BIOS/EC information is in sync with Host OS context or not. The meta data provides the BIOS/EC firmware previous functional context of the previous motherboard 440. If the bios/EC information is not in sync, the firmware may be re-trained according to a prior motherboard dispatch state.

Figure 5:
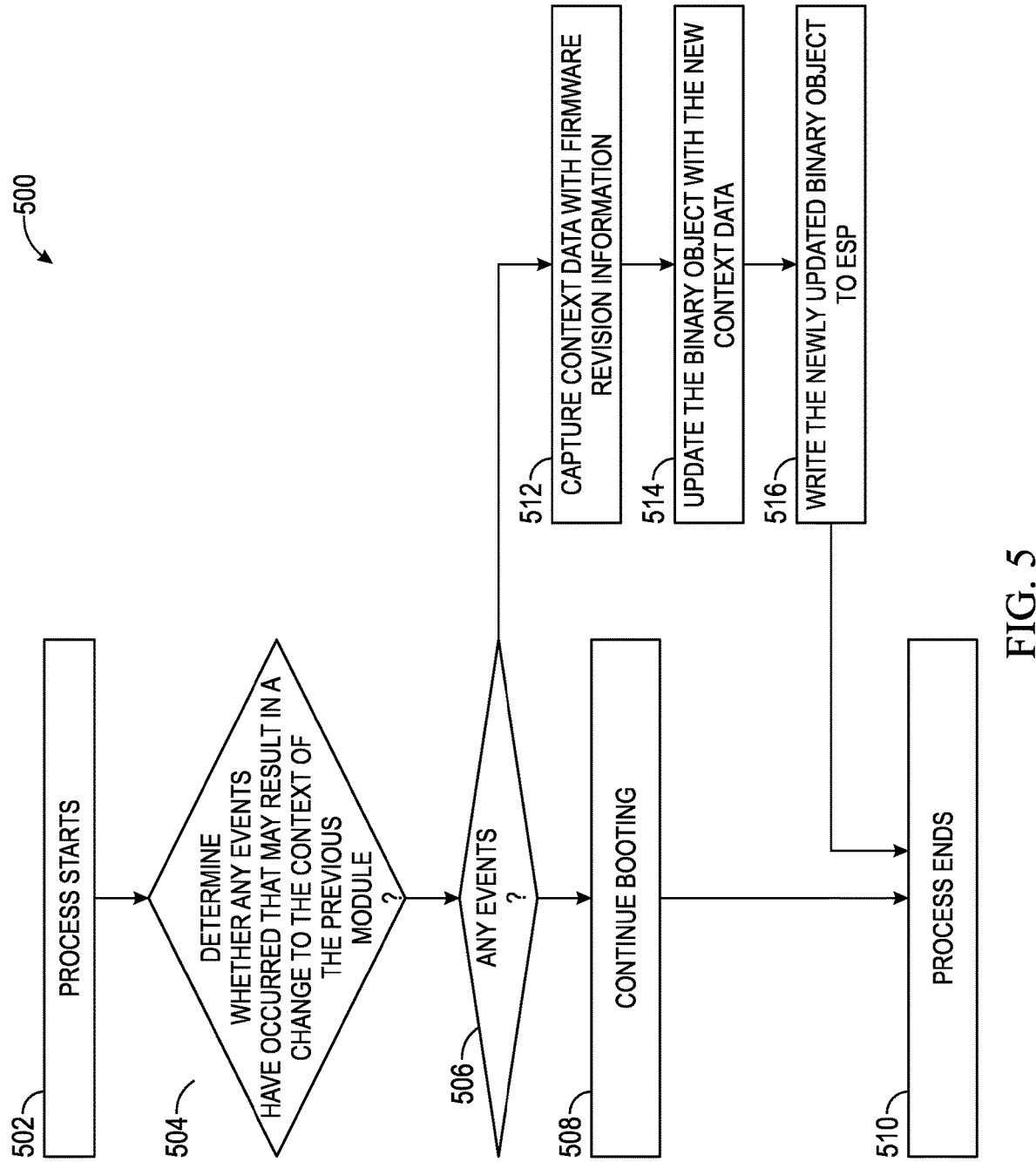
FIG. 5 illustrates an example context data updating method that may be performed to update context data in the binary object when an event is encountered according to one embodiment of the present disclosure.

FIG. 5 illustrates an example context data updating method 500 that may be performed to update context data in the binary object 432 when an event is encountered according to one embodiment of the present disclosure. For example, the method 500 may be performed to the previous motherboard 440 to gather context data associated with the previous motherboard 440 so that when a replacement of the previous motherboard 440 occurs, the context data may be transferred to the new replacement motherboard 442. Additionally or alternatively, the context data updating method 500 may be performed in whole or in part by the motherboard replacement system 300 described above with reference to FIG. 3. The method 500 may be performed at any suitable time, such as during the PEI and/or DXE phase of a boot process.

While the present embodiment describes a process for updating the binary object 432 during a system re-boot process, at runtime (OS phase of execution) and in a context healthy state, an EC/BIOS coordinated method may be performed to push context data as it is identified using a secure connection through the BIOS and UEFI storage driver to the NVMe storage unit 430.

At step 502, the method 500 starts. At step 504, the method 500 determines whether any events have occurred that may result in a change to the context of the previous motherboard 440. Examples of such events may include addition and/or removal of a hardware component (e.g., NIC card, I/O expansion card, video card, etc.), BIOS configuration change, change of security context, and the like. At step 506, if any context changing events are not encountered, the method 500 continues at step 508 to continue booting in the normal manner in which the process ends at step 510. If, however, context changing event are encountered, processing continues at step 512.

At step 512, the method 500 captures (e.g., acquires) the context data with firmware revision information. Thereafter at step 514, the method 500 updates the binary object 432 with the new context data, and if no binary object currently exists, the method 500 may generate a new binary object 432 to store the newly captured context data. The method 500 then writes the newly updated binary object 432 to the EFI system partition (ESP) at step 516. In one embodiment, the binary object 432 may be encrypted with a certificate and/or key to ensure its integrity and security. Thereafter, the method 500 continues processing at step 508 to finish the boot process.

The method 500 described above may be performed any time the IHS is re-booted or initially booted for the first time following manufacture. Nevertheless, at step 510, the method 500 ends.

Figure 6:
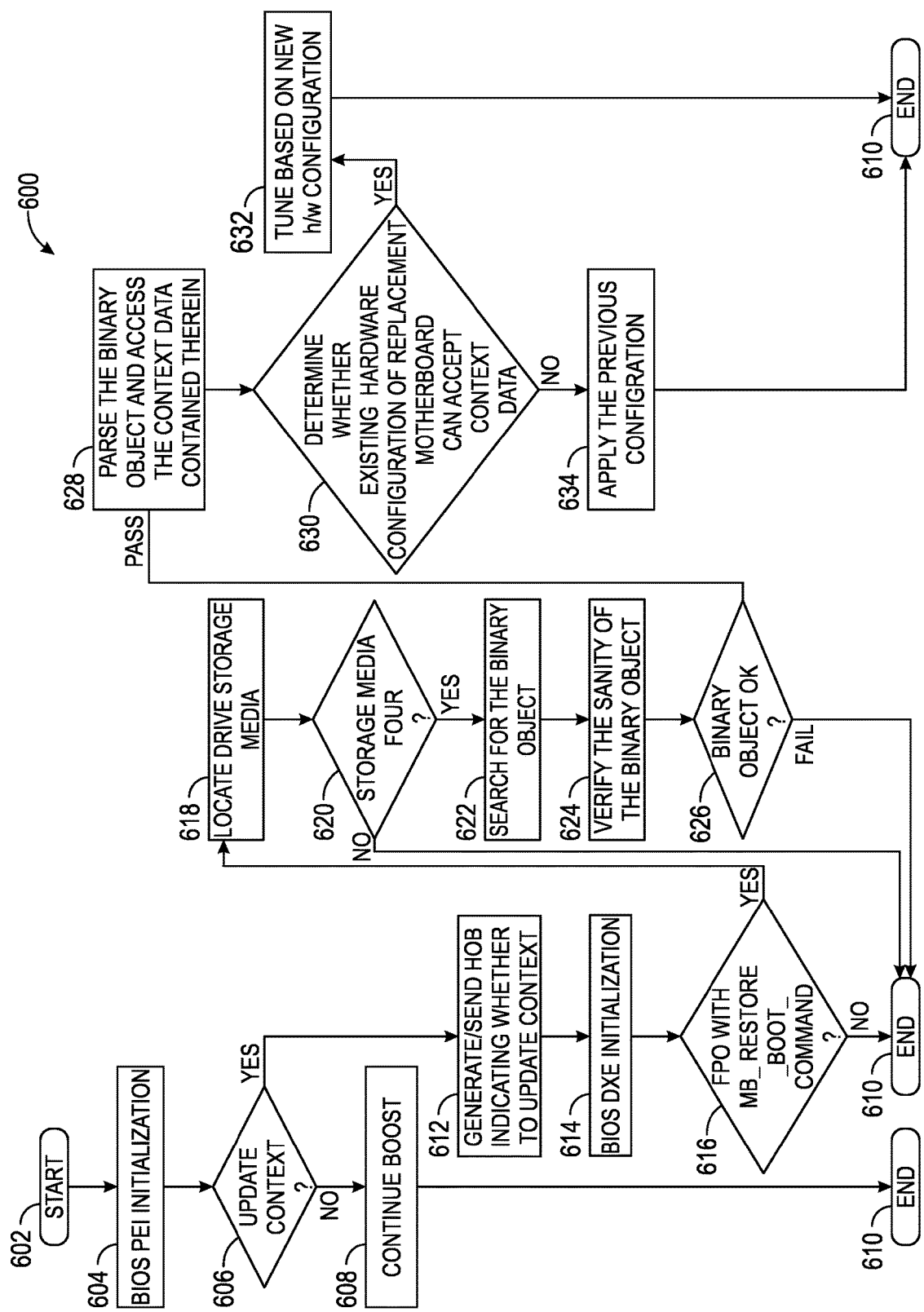
FIG. 6 illustrates an example motherboard replacement method 500 that may be performed to transfer context data to the replacement motherboard when it is deployed in the IHS.

FIG. 6 illustrates an example motherboard replacement method 600 that may be performed to transfer context data 446 to the replacement motherboard 442 when it is deployed in the IHS. Additionally or alternatively, the motherboard replacement method 600 may be performed in whole or in part by the motherboard replacement system 400 described above with reference to FIG. 4. The method 600 may be performed any time a motherboard is replaced in the IHS. In one embodiment, the method 600 may be performed when the replacement motherboard 442 is initially installed in the IHS to replace the previous motherboard 440.

At step 602, the method 600 starts. At step 604, the method 600 enters the PEI phase of a boot process. The method 600 then determines whether the replacement motherboard 442 configured in the IHS is being powered on for the first time at step 606. If not, processing continues at step 608 in which the boot process is continued on to completion, and the method 600 ends at step 610. If the IHS is being powered on for the first time, however, processing continues at step 612.

At step 612, the PEI interface module 422 generates and sends a Hand Over Block (HOB) to be used by the DXE interface module 424 in which the hob indicates whether the replacement motherboard 442 should be updated with the context data stored in the NVMe storage unit 430. At step 614, the DXE phase commences. Thereafter, the DXE interface module 424 commences its operation, and at step 616, it determines whether the context data in the replacement motherboard 442 should be updated according to the received hob. If not, the method 600 ends at step 610. If the context data is to be updated, however, processing continues at step 618. The DXE interface module 424 at step 618 searches for the storage unit. For example, scenarios exist in which the NVMe storage unit 430 has not been installed in the IHS and therefore, no updating of the context data on the replacement motherboard 442 is possible. If, at step 620, the NVMe storage unit 430 is not found, the method 600 ends at step 610, but if found, processing continues at step 622 in which the DXE interface module 424 identifies the binary object 432 in the NVMe storage unit 430. Once found, the DXE interface module 424 at step 624 verifies the integrity of the binary object 432, for example, using the encryption key that was used to encrypt the binary object 432 as described above with reference to step 514 of FIG. 5. At step 626, if the binary object 432 is good, processing continues at step 628; otherwise, processing continues at step 610 in which the method 600 ends.

At step 628, the DXE interface module 424 parses the binary object and accesses the context data stored inside. Thereafter at step 630, the DXE interface module 424 determines whether the existing hardware configuration of replacement motherboard 442 can accept the context data. If so, processing continues at step 632 in which the replacement motherboard 442 is tuned based on the new hardware configuration; otherwise, processing continues at step 634 in which the previous configuration is maintained. For example, if the CPU on the replacement motherboard 442 has only four cores, while the context data includes certain configuration settings indicating that the CPU on the previous motherboard 440 had eight cores, the DXE interface module 424 may not update the replacement motherboard 442 with those configuration settings due to the core count mismatch. As another example, a security context of the previous motherboard 440 may have utilized a certain virtualization function that is not available on the replacement motherboard 442. As such, the DXE interface module 424 may not implement the security context, and/or update a logfile indicating that the security context of the previous motherboard 440 cannot be implemented properly in the replacement motherboard 442. At this point, the method 600 ends at step 610.

Although FIGS. 5 and 6 describe example methods 500 and/or 600 that may be performed to update the context data in the binary object 432, and update a replacement motherboard 442 with that context data, the features of either method 500 and/or 600 may be embodied in other specific forms without deviating from the spirit and scope of the present disclosure. For example, either of the methods 500 and/or 600 may perform additional, fewer, or different operations than those described in the present examples. For another example, either of the methods 500 and/or 600 may be performed in a sequence of steps different from that described above. As yet another example, certain steps of either method 500 and/or 600 may be performed by other components in the IHS 100 other than those described above.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," when used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a processor; and
a memory coupled to the processor, the memory having program instructions stored thereon that, upon execution, cause the IHS to:
when a previous motherboard is replaced with a replacement motherboard:
detect that the previous motherboard has been replaced with the replacement motherboard;
access context data associated with the previous motherboard from a NVMe storage unit that is deployed in the IHS independently of the replacement motherboard, the context data comprising configuration settings of the previous motherboard; and
update the replacement motherboard according to the stored context information; and
during an Operating System (OS) phase of the IHS, write the context data to the NVMe storage unit using a secure connection.

2. The IHS of claim 1, wherein the program instructions, upon execution, further cause the IHS to:
determine whether the replacement motherboard is able to accept the context data; and
update the replacement motherboard only when the replacement motherboard is able to accept the context data.

3. The IHS of claim 2, wherein the program instructions, upon execution, further cause the IHS to:
determine, for each element of the context data, whether the replacement motherboard is able to accept the element; and
update the replacement motherboard with the element only when the replacement motherboard is able to accept the element.

4. The IHS of claim 1, wherein the program instructions, upon execution, further cause the IHS to perform the acts of detecting, accessing, and updating only when the replacement motherboard is started for the first time.

5. The IHS of claim 1, wherein the program instructions, upon execution, further cause the IHS to:
encrypt the context data stored in the NVMe storage unit; and
decrypt the context data when the context data is accessed from the NVMe storage unit to verify an integrity of the context data.

6. The IHS of claim 1, wherein the program instructions, upon execution, further cause the IHS to perform the acts of detecting, accessing, and updating during a Basic Input/Output System (BIOS) phase of operation of the IHS.

7. The IHS of claim 6, wherein the program instructions, upon execution, further cause the IHS to:
   determine, during the BIOS phase, at least one change to a system configuration of the previous motherboard; and
   update the context data in the storage unit to indicate the change to the system configuration.

8. A method comprising:
   when a previous motherboard is replaced with a replacement motherboard:
      detecting that a previous motherboard has been replaced with a replacement motherboard;
      accessing context data associated with the previous motherboard from a NVMe storage unit that is deployed in an Information Handling System (IHS) independently of the replacement motherboard, the context data comprising configuration settings of the previous motherboard; and
      updating the replacement motherboard according to the stored context information; and
   during an Operating System (OS) phase of the IHS, writing the context data to the NVMe storage unit using a secure connection.

9. The method of claim 8, further comprising:
   determining whether the replacement motherboard is able to accept the context data; and
   updating the replacement motherboard only when the replacement motherboard is able to accept the context data.

10. The method of claim 9, further comprising:
    determining, for each element of the context data, whether the replacement motherboard is able to accept the element; and
    updating the replacement motherboard with the element only when the replacement motherboard is able to accept the element.

11. The method of claim 8, further comprising performing the acts of detecting, accessing, and updating only when the replacement motherboard is started for the first time.

12. The method of claim 8, further comprising:
    encrypting the context data stored in the NVMe storage unit; and
    decrypting the context data when the context data is accessed from the NVMe storage unit to verify an integrity of the context data.

13. The method of claim 8, further comprising performing the acts of detecting, accessing, and updating during a Basic Input/Output System (BIOS) phase of operation of the IHS.

14. The method of claim 13, further comprising:
    determining, during the BIOS phase, at least one change to a system configuration of the previous motherboard; and
    updating the context data in the storage unit to indicate the change to the system configuration.

15. A Basic I/O System (BIOS) having program instructions stored in a memory that, upon execution by an Information Handling System (IHS), cause the IHS to:
    when a previous motherboard is replaced with a replacement motherboard:
       detect that the previous motherboard has been replaced with the replacement motherboard;
       access context data associated with the previous motherboard from a NVMe storage unit that is deployed in the IHS independently of the replacement motherboard, the context data comprising configuration settings of the previous motherboard; and
       update the replacement motherboard according to the stored context information; and
    during an Operating System (OS) phase of the IHS, write the context data to the NVMe storage unit using a secure connection.

16. The BIOS of claim 15, wherein the program instructions, upon execution, further cause the IHS to:
    determine whether the replacement motherboard is able to accept the context data; and
    update the replacement motherboard only when the replacement motherboard is able to accept the context data.

* * * * *